April 22, 1958   A. A. NAYMAN   2,831,281
LICENSE PLATE HOLDER
Filed Nov. 8, 1956
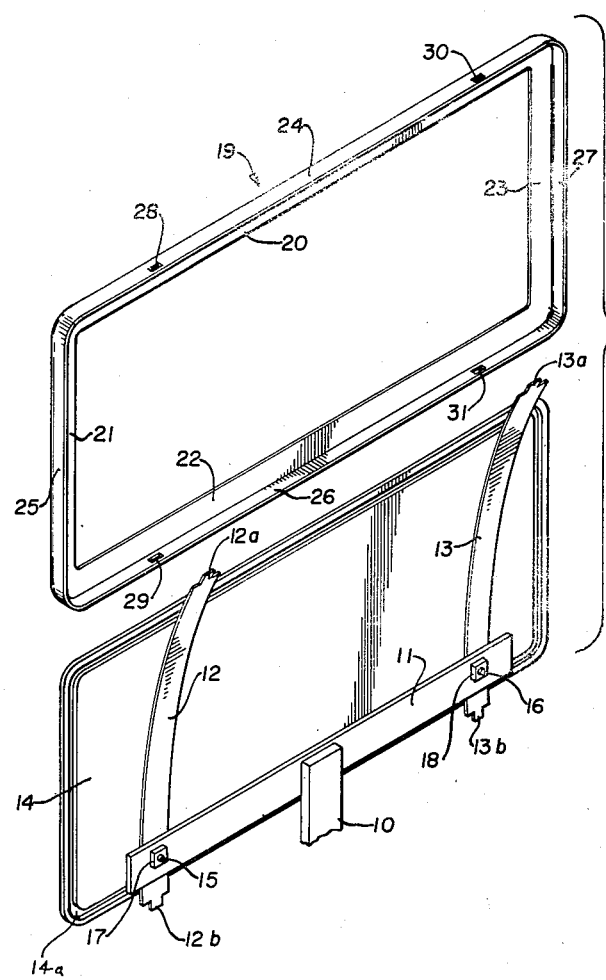
Fig. I
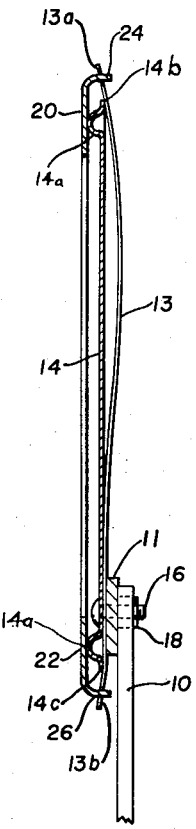
Fig. 3
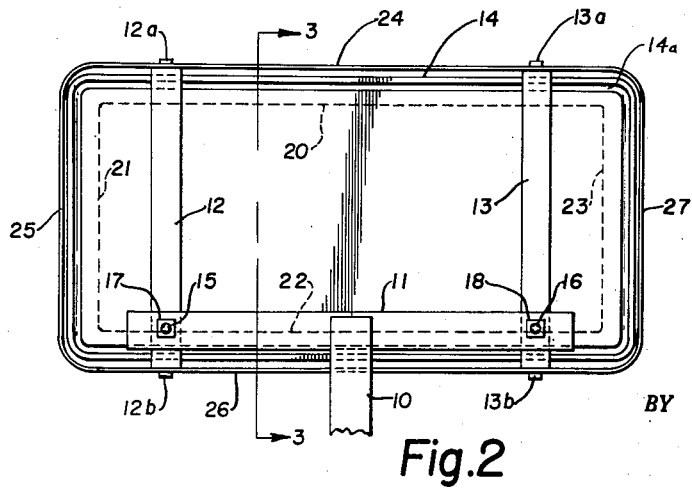
Fig. 2
INVENTOR.
ALVIN A. NAYMAN
BY
J. N. Douglass
His ATTORNEY United States Patent Office 2,831,281
Patented Apr. 22, 1958

2,831,281

LICENSE PLATE HOLDER

Alvin A. Nayman, Cleveland, Ohio, assignor to Quality Stamping Products Company, Cleveland, Ohio Application November 8, 1956, Serial No. 621,076

3 Claims. (Cl. 40—125)

This invention relates to a license plate holder for automotive vehicles.

In recent years many brands of automobiles have been provided with license plate holders which include a metal shield extending around the edges of the plate and across the front of the plate at the marginal portions thereof next to the edges. Such shields protect the license plates from being bent out of shape by contact with extraneous objects, as well as providing a pleasing decorative effect. One objection to such shields has been the inconvenience of attaching the shield and the license plate together, particularly when the nuts and bolts used for this purpose have become rusted by the time it is necessary to change over from one year's plates to the next.

The present invention is directed to a novel license plate holder arrangement which minimizes this changeover difficulty, at the same time providing a rugged mounting and shield for the license plate when in use.

Accordingly, it is an object of the present invention to provide a novel and improved license plate holder for automotive vehicles.

Another object of this invention is to provide a novel license plate holder arrangement which facilitates the assembly and detachment of the license plate and its holder.

Further objects and advantages of the invention will be apparent from the following detailed description of a preferred embodiment of the invention, which is illustrated in the accompanying drawing.

In the drawing:

Fig. 1 is an exploded perspective view showing the license plate and the components of the present holder;

Fig. 2 is a rear elevational view of the holder and license plate assembled together; and Fig. 3 is a vertical section through the Fig. 2 assembly, taken along the line 3—3 in Fig. 2.

Referring to the drawing, the automobile commonly is provided with an upstanding vertical post 10 which is attached to the bumper of the car. A flat elongated cross-piece 11 is rigidly attached to the upper end of post 10, as by welding. This cross-piece projects out at either side of the post. Thus far, the construction of the holder is conventional.

In accordance with the present invention, a pair of upstanding leaf springs 12 and 13 are attached near their lower ends to the cross-piece 11 adjacent opposite ends of this cross-piece at the outer side thereof, away from the car body. The license plate 14 is attached to the assembly of the leaf springs 12, 13 and cross-piece 11 at the outer side of the leaf springs, away from the car body. Such attachments are made by means of bolts 15 and 16 having their enlarged heads engaging the outer face of the license plate 14 and threaded shanks extending freely through aligned holes in the license plate 14, the respective leaf springs 12, 13, and the cross-piece 11. Nuts 17 and 18 are threaded onto these bolts and engage the inner side of cross-piece 11, toward the car body, to clamp the parts in assembled relation.

The leaf springs 12 and 13 in their unstressed condition (Fig. 1) have a bowed shape, with their free upper ends extending toward the car body. At their upper and lower ends the leaf springs terminate in reduced tabs 12a, 12b, 13a and 13b, respectively, which are smooth continuations of the main body of each spring. These upper and lower tabs are disposed above and below the top and bottom edges, respectively, of the license plate.

The license plate is formed with the usual continuous, forwardly protruding hollow rib 14a, which extends across the front of the plate close to the top, side and bottom edges thereof.

The final component of the assembly is a rigid shield 19 of metal or other suitable material to protect the license plate. This shield comprises interconnected, coplanar panels 20, 21, 22 and 23 to extend across the front of the plate at the top, side and bottom marginal portions and transverse flanges 24, 25, 26 and 27 interconnected to extend around the top, side and bottom edges of the license plate. The top and bottom flanges 24 and 26 on shield 19 are formed with aligned holes 28 and 29, respectively, positioned to receive the tabs 12a and 12b on leaf spring 12. Similarly, these flanges are formed with aligned openings 30 and 31 located to receive the tabs 13a and 13b on leaf spring 13.

The preferred way of assembling shield 19 onto the license plate is to insert the lower tabs 12b and 13b of the leaf springs 12, 13 into the openings 29, 31 in the bottom flange 26 of the shield. Then the upper ends of both leaf springs 12, 13 are bent against the natural bow of the springs and the upper tabs 12a and 13a are snapped into the holes 28 and 30 in the top flange 24 on the shield. When thus assembled, referring to Fig. 2, the springs 12, 13 are stressed and the upper ends of these springs engage the upper edge 14b of the license plate at the back of the plate and force the hollow rib 14a on the front of the plate tightly against the back of the upper panel 20 on shield 19. Similarly, the lower ends of the springs are flexed away from the car body and engage the bottom edge 14c of the license plate, forcing the rib 14a snugly against the back of the bottom panel 22 on shield 19. In this manner, the shield 19 is held firmly in place on the license plate, while at the same time its removal or attachment may be accomplished readily simply by flexing the leaf springs.

From the foregoing it will be apparent that the illustrated arrangement is exceptionally well-suited for the accomplishment of the purposes of the present invention, providing for the ready assembly or disassembly of the license plate and its holder with a minimum of effort. However, it is to be understood that, while there has been described in detail herein and illustrated in the accompanying drawing a particular preferred embodiment of the present invention, various modifications, omissions and refinements which depart from the illustrated embodiment may be adopted without departing from the spirit and scope of the invention.

I claim:

1. A license plate holder assembly comprising a shield having panel portions to extend across marginal portions of the license plate at the front thereof and upper and lower transverse flanges to extend across the upper and lower edges of the license plate, a support at the inner side of said shield, and a pair of spaced leaf springs mounted on said support at the inner side of said shield and each having a free end spaced from said support, both of said leaf springs when unstressed being bowed to position their free ends away from the shield at the inner side thereof, and said leaf springs and the flanges on the shield having cooperating protrusions and recesses which interfit to mount the shield on the leaf springs and said support and to stress the leaf springs opposite to the direction in which they are bowed.

2. A license plate holder assembly comprising a shield having front panel portions to extend across marginal portions of the license plate at the front thereof and upper and lower transverse horizontal flanges projecting back from said front panel portions to extend across the upper and lower edges of the license plate, said shield being formed with spaced pairs of aligned openings in its upper and lower flanges, an elongated horizontal support at the inner side of the shield, and a pair of leaf springs attached near their lower ends to said support at locations thereon spaced apart horizontally a distance substantially equal to the spacing between said pairs of openings in the shield, each of said leaf springs being bowed to position its upper end away from said shield at the inner side thereof, each of said leaf springs terminating at its upper and lower ends in reduced tabs shaped and dimensioned to be received in said openings in the flanges on the shield to mount the shield on said leaf springs and said support with the license plate between the shield and the leaf springs and to stress the leaf springs opposite to the direction in which they are bowed to engage the upper and lower edges of the license plate.

3. A license plate and holder assembly comprising an elongated horizontal support, a pair of leaf springs attached near their lower ends to the outer side of said support and bowed to position their respective upper ends toward the inner side of said support, a license plate bolted to the inner side of said leaf springs and said support and having forwardly projecting hollow rib portions near its top and bottom edges, said leaf springs at their lower ends projecting below the bottom edge of the license plate and terminating at their lower ends in reduced tabs, said leaf springs at their upper ends projecting above the top edge of the license plate and terminating at their upper ends in reduced tabs, and a shield at the front of the license plate having front panel portions which extend across the license plate at said hollow rib portions thereof and upper and lower transverse flanges which project back from said front panel portions and extend across the top and bottom edges of the license plate, said shield being formed with pairs of aligned openings in its upper and lower flanges, and said leaf springs having their reduced tabs received in said openings to stress the springs opposite to the direction in which they are bowed and positioning the springs in engagement with the top and bottom edges of the license plate to maintain the license plate with its hollow rib portions seated against said front panel portions on the shield.

References Cited in the file of this patent
UNITED STATES PATENTS

| | | |
|---|---|---|
| 1,142,002 | Willhardt | June 8, 1915 |
| 1,706,509 | Woolf | Mar. 26, 1929 |
| 1,815,767 | Fusmer | July 21, 1931 |
| 1,913,773 | Scaplen | June 13, 1933 |
| 2,073,403 | Goldberg | Mar. 9, 1937 |